United States Patent [19]

De Francesco et al.

[11] 3,897,379

[45] July 29, 1975

[54] TIME BASE ERROR CORRECTION FOR RECORDING SYSTEMS

[75] Inventors: Richard E. De Francesco, Holland, Pa.; Bernard Harris, Dobbs Ferry, N.Y.; David Hoffman, Hillsdale, N.J.

[73] Assignee: The United States of America as represented by the Secretary of the Navy, Washington, D.C.

[22] Filed: Oct. 4, 1974

[21] Appl. No.: 512,835

[52] U.S. Cl. .................................................. 360/27

[51] Int. Cl. .............................................. G11b 5/43

[58] Field of Search ............. 360/27, 26, 51, 43, 40, 360/46

[56] References Cited

UNITED STATES PATENTS 3,789,379 1/1974 Breikss.................................. 360/27

*Primary Examiner*—Vincent P. Canney
*Attorney, Agent, or Firm*—R. S. Sciascia; Henry Hansen

[57] ABSTRACT

A deflutter device for FM recording on magnetic tape which corrects for a varying time base error. Zero crossings from the outputs of a reference oscillator and a reference tone on a first tape track are compared by a flip-flop whose output is a pulse having a width corresponding to the time base error. The output pulse enables a binary counter to provide a digital output which is transformed to an analog voltage by a digital to analog converter. Zero crossings from a second tape track containing recorded data are detected and shifted by a delay multivibrator in accordance with the analog voltage thereby correcting for the time base error.

13 Claims, 2 Drawing Figures

TIME BASE ERROR CORRECTION FOR RECORDING SYSTEMS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to a means for minimizing flutter in tape recording systems and particularly to a device for correcting for time base error in magnetic tape recorders having data recorded by FM techniques.

In using tape recorders for the storage and playback of pulse type data, variations in the recorder and playback speed result in spurious signals commonly known as flutter. These speed variations may be caused by type slippage, mechanical vibration, imperfect mechanical motion, changes in the dimension of the recording medium, or variations in the speed of the recorder drive system. Flutter is a relatively slow variation in the speed of the tape past the recording or playback head. Because speed is one of the factors that determines the timing of the data signal to be reproduced, any variation in this speed will produce a variation in the reproduced signal. Thus flutter becomes a serious problem in the recording and reproducing of pulse type signals on FM tape recorders.

In a typical FM tape recording system using a reference tone track for speed control, a highly stable tone is recorded on one track at the same time that the data signal is recorded on a second track. The source of the highly stable tone is provided by a reference oscillator. The reference tone is concurrently used as a control signal in an electromechanical servo system to maintain a rotating type drive capstan at a constant speed during the recording process. Typically, a tachometer coupled to the recorder capstan provides the necessary feedback signal during recording. During the reproduction process, a reference tone which has the same characteristics as that used in recording, together with the output of the reference track is applied to a phase lock servo loop which attempts to control the tape speed so that the tone obtained from the reference track is a time replica of the original tone applied to the reference track during recording. Accordingly, if the servo technique were errorless, the playback data signal would also be a time replica of the original signal, providing also that there was no skewing of the tape. Skewing implies that the time displacements of all the tracks is not uniform. Thus, skewing deteriorates the effectiveness of the tape lock servo because the servo can only correct for errors in time cohernece with the reference track. The instantaneous time base error (TBE) can readily be observed by taking a measurement of the time difference between the zero crossings of the signal from the reference oscillator or tone generator and the signal obtained from the reference track on playback. It has been observed in some reproducers running at a tape speed of 7.5 inches per second that time base errors of up to 1.5 $\mu$sec. and greater remain after correction by the electromechanical servo, depending upon the particular tape recorder being utilized.

Prior efforts to minimize such errors have included the use of methods for keeping speed variations to a minimum by sophisticated electromechanical servo techniques with well designed and accurately machined tape transport mechanisms. Other attempts at reducing flutter employed various signal cancellation and compensation schemes involving the playback discriminator of FM tape recorders.

SUMMARY OF THE INVENTION

Accordingly, it is an object of the present invention to provide a device which will substantially reduce the amount of recoverable flutter in FM tape reproducing systems. Another object is to significantly reduce tape recorder time base error. Yet another object of the present invention is to implement a deflutter device through the use of a relatively modest amount of noncomplex circuitry thereby providing a relatively compact and lightweight flutter reduction system.

Briefly, these and other objects are accomplished by a deflutter device for FM magnetic tape recorders which corrects for a varying time base error. Zero crossings are detected from the output of a reference oscillator and a reference tone on a first tape track. A delay circuit delays the zero crossings of the reference tone which are compared against the zero crossings of the reference oscillator by a flip-flop whose output is a pulse having a width corresponding to the time base error. The output pulse enables a binary counter to provide a digital output which is transformed to an analog voltage by a digital-to-analog converter. A variable delay multivibrator receives detected zero crossings from a second tape track containing recorded data and advances or delays the received zero crossings according to the value of the analog voltage representative of the time base error. The trailing edge of the output signal from the delay multivibrator is detected as a small pulse and triggers a single shot which conditions the pulse to toggle a flip-flop which provides corrected output data.

For a better understanding of these and other aspects of the invention, reference may be made to the following detailed description taken in conjunction with the accompanying drawings.

DESCRIPTION OF THE PREFERRED EMBODIMENT

Figure 1:
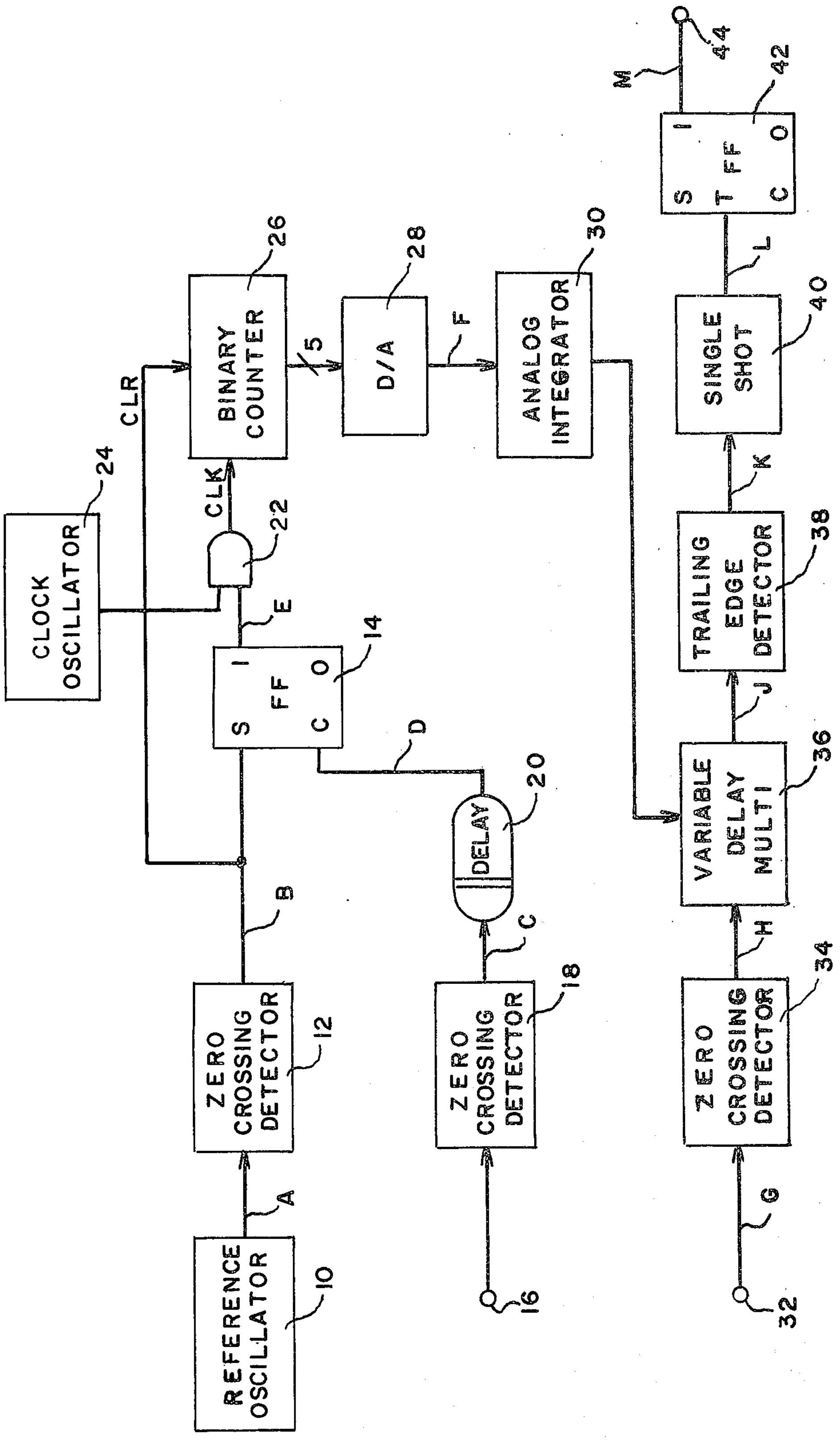
FIG. 1 is a block diagram of the present invention.

Referring now to FIG. 1, there is shown a block diagram of a time base error correcting device according to the present invention. A reference oscillator 10 is connected to provide an output to the input of a first zero crossing detector 12. A flip-flop 14 has its set input connected to receive the output from the detector 12. A first input terminal 16 is adapted to receive a reference tone from a first tape track which is provided to the input of a second zero crossing detector 18 whose output is connected to the input of a delay circuit 20. The output of the delay circuit 20 is connected to the reset input of flip-flop 14. The non-inverting or 1 output of flip-flop 14 is connected to one input of an AND gate 22 having a second input connected to receive the output from a clock oscillator 24. A binary counter 26 has a clear input connected to receive the output from detector 12 and a clock input connected to receive the output from gate 22. A digital-to-analog (D/A) converter 28 is connected to receive five parallel outputs from the binary counter 26 and provides a single output to the input of an analog integrator 30. A second input terminal 32 is adapted to receive a data signal from a second tape track which is provided to the input of a third zero crossing detector 34 whose output is provided to the input of a variable delay multivibrator 36. The multivibrator 36 is connected to receive an error control signal from the output of integrator 30 and provides an output to the input of a trailing edge detector 38. A single shot multivibrator 40 is connected to receive the output from detector 38 and provides an output signal to the toggle input of a flip-flop 42 having a non-inverting output connected to an output terminal 44.

Figure 2:
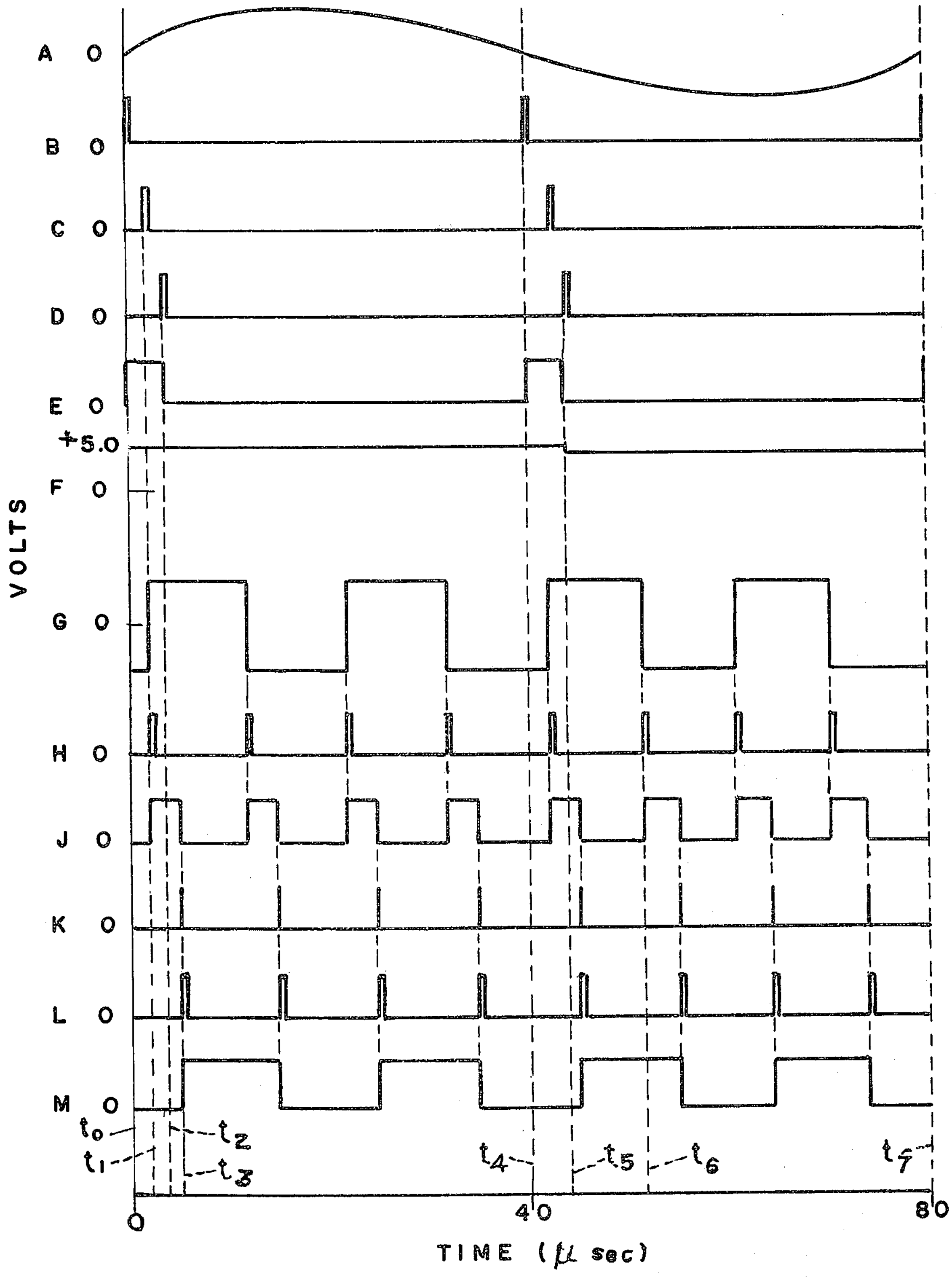
FIG. 2 is a diagram of signal waveforms generated by the invention shown in FIG. 1.

Referring now to FIG. 2, in conjunction with FIG. 1, there is shown various examples of signal waveforms that are generated at different points within the block diagram of the invention shown in FIG. 1. In order to better explain the present invention and to give a specific example of its operation, particular structural elements of the invention shown in FIG. 1 will be assigned specific operating parameters. For example, the reference oscillator 10 is assumed to be operating at a frequency of 12.5 kilohertz. Similarly, the input terminal 16 is adapted to receive a pre-recorded reference tone of an everage frequency of 12.5 kilohertz. The reference tone, which is produced by the reference oscillator, is recorded upon one track of magnetic tape during the recording process. The input terminal 32 is adapted to receive an FM data signal having a carrier frequency, for example, of 50 kilohertz. The FM data signal is recorded on a second track of the same tape which is used to record the reference tone. Both of the signals on input terminals 16 and 32 are assumed to be of a digital pulse format with the positive and negative excursions of the pulses always crossing a threshold or zero level amplitude. Other input waveforms of a sinusoidal or AC varying type may also be used with the present invention. The data being recorded may be representative, for example, of acoustic signals gathered by hydrophones that are sensing the signatures of submarines. Because transducers typically provide an analog output signal, an FM modulator is most often provided to change the transducer analog output signals into a pulse type format most suitable for tape recording and subsequent operation by the present invention. Correspondingly, the output terminal 44 of the present invention provides a time base error corrected signal having a pulse format which would be typically connected to the input of an FM demodulator so as to reconvert the corrected reproduced signal to its original analog form.

The reference oscillator 10 provides a 12.5 kilohertz output signal as shown in waveform A, FIG. 2. Waveform A is sinusoidal having a period of 80 μsec. and which crosses a zero or threshold level at $t_o$, $t_4$, and $t_7$. The first zero crossing detector 12 which may be, for example, a voltage comparator receives the output signal from oscillator 10 and produces a signal as shown in waveform B of FIG. 2. Waveform B illustrates a series of three pulses approximately 0.1 μsec. wide occurring at $t_o$, $t_4$, $t_7$ which correspond to the zero crossings of the signal shown in waveform A. Input terminal 16 is adapted to receive the 12.5 kilohertz reference tone from the output of the first track of the magnetic tape and connects the reference tone to the input of the second zero crossing detector 18.

The second zero crossing detector 18 receives the reference tone signal from input terminal 16 and provides an output signal shown in waveform C of FIG. 2. Waveform C illustrates a series of two pulses which coincide with the zero crossings of the tone on the reference track. Accordingly, it will be seen that the first pulse at $t_1$ in waveform C lags the first pulse at $t_o$ in waveform B by approximately 1.5 μsec. Similarly, the second pulse in waveform C lags the second pulse at $t_4$ in waveform B by approximately 1.4 μsec. For purposes of illustrating this example of operation, a lagging tone zero crossing will be referred to as a positive (+) TBE, and a leading tone zero crossing will be referred to as a negative (−) TBE. Only the lagging case is illustrated in this example since the leading case is similarly processed. The delay 20 receives the output signal from the detector 18 and produces an output signal as shown in waveform D which is a replica of the input signal but delayed in time a fixed period. The delay 20 is conventional and may, for example, comprise an analog delay line, a clocked digital shift register or a clocked digital counter. In the present example it is assumed that the maximum leading or lagging TBE is 1.5 μsec. Obviously, the degree of error will vary with the recording system being utilized and the period of the delay 20 may accordingly be adjusted to accomodate the situation. The purpose of the delay 20 is to eliminate the necessity of dealing with both a leading and a lagging TBE. Accordingly, if the delay 20 period is set to 1.5 μsec. as in the present example, any tone zero crossings that produce a leading time base error will be delayed so as to remove the time lead entirely and provide either an in-phase or lagging time reference to the zero crossings of the reference oscillator 10. Therefore, any reference tones that produce a time lag zero crossing with reference to the zero crossings of oscillator 10 will only be further delayed 1.5 μsec. with a resultant maximum delay of 3.0 μsec.

The flip-flop 14 has its set input connected to receive the output from the zero crossing detector 12 and its reset or clear input connected to receive the output from the delay 20. Accordingly, the 1 output from the flip-flop 14 provides an output pulse as shown in waveform E whose positive going edge is set by the first pulse at $t_o$ in waveform B and whose negative going edge is reset by the first pulse at $t_2$ shown in waveform D. Thus the width of the pulse $t_o$–$t_2$ shown in waveform E is indicative of the time base error between the zero crossing of the reference oscillator and the zero crossing of the reference tone on the tape track. In the case of the second pulse shown in waveform B at $t_4$, the corresponding pulse $t_4$–$t_5$ in waveform E is 2.9 μsec. wide.

The AND gate 22 has its first input connected to receive the output of the flip-flop 14 shown in waveform E and a second input connected to receive the output from the clock oscillator 24. The output of the AND gate 22 is connected to the clock input of the binary counter 26 and passes clock signals produced by oscillator 24 to the counter according to the duration of the flip-flop output pulse shown in waveform E. Accordingly, the binary counter 26 is permitted to count to an integer proportional to the duration of the pulse width shown in waveform E. In order to insure that the binary counter 26 always starts from a zero count, the output of the zero crossing detector 12 is connected to the clear input of the counter so as to clear the counter 26 upon the occurrence of each zero crossing of the reference oscillator 10. In this particular example, the maximum width of the pulse produced by the output of flip-flop 14 is 3.0 μsec. Accordingly, a convenient count for the counter 26 representative of a 3.0 μsec. pulse is a count of 30. Therefore, the number of binary stages or outputs required by the counter 26 is five. The frequency of the clock oscillator 24 may now be determined due to the requirement of having the binary counter 26 increment by 30 counts during a period of 3.0 μsec. thus requiring an oscillator frequency of 10 MHz. or a clock period of 0.1 μsec. Of course, if it is desired that the output pulse from flip-flop 14 be more finely resolved into smaller time increments, the number of counts within the counter 26 and the frequency of oscillator 24 may be correspondingly increased. Accordingly, since the pulse width $t_o$–$t_2$ in waveform E is a maximum of 3.0 μsec, the counter 26 is counted to a count of 30 due to the passing of 30 clock pulses from the oscillator 24 through the gate 22. It should be noted that the variable counting capacity of counter 26 is sufficient to represent various degrees of time base error and, as in the present case with a positive time base error of 1.5 μsec., the corresponding count is 30. Correspondingly, with a zero time base error, the count would be 15 and with a negative time base error of 1.5 μsec. the count is zero. Accordingly, in this example, the five parallel outputs from the counter 26 are indicative of the binary representation of the integer 30 which is received by correspondingly parallel inputs of the digital-to-analog converter 28 which converts the incoming binary count to an analog voltage indicative of that binary count. Waveform F of FIG. 2 illustrates a sequence of arbitrarily selected, but scaled, levels for this example indicative of the binary values produced by the counter 26. For example, a count of 30 will cause the D/A converter 28 to produce a +5 volt level and a zero count will produce a zero voltage level. Other counts between the two extremes will produce proportionately corresponding voltages between 0 and +5 volts. Accordingly, at the culmination of the count by counter 26 at $t_2$ with a maximum count of 30, the output of the D/A converter 28 is shown in waveform F as +5 volts. For continuity in the illustration of waveform F the +5 volt level is continued for a time prior to $t_2$ and it may be accordingly assumed that the prior counting period also produced a count of 30 with a resultant maximum voltage produced by the D/A 28. The +5 volt level is retained at the output of the D/A 28 until the next count is completed by the binary counter at which time a new binary value is converted by the converter 28. In this example, the counter 26 is reset at $t_4$ shown in waveform B at which time it begins to count to a value of 29. Waveform E shows a correspondingly small decrease at $t_5$ in D/A output voltage which can be calculated to be approximately 4.83 volts. The analog integrator 30 receives the output from the converter 28 and integrates the changing voltage levels shown in waveform F so as to smooth over the voltage switching periods that occur at approximately 12.5 kilohertz. The input terminal 32 is adapted to receive the data signal which is recorded on a second track of the same tape on which the reference tone was recorded. As mentioned earlier, the data signal is often passed through an FM modulator prior to recording so as to convert analog data into a pulse type format which periodically crosses a zero or threshold level. Accordingly, a pulse modulated data signal is shown in waveform G of FIG. 2 and, in this example, is representative of an unmodulated FM carrier of 50 kilohertz having a corresponding period of 20 μsec. Assuming a minimal amount of mechanical eccentricity during the recording process, it may be presumed that the FM data signal will either time lead or time lag corresponding to the lead or lag indicated by the reference tone on the first tape track.

Because the 50 kilohertz FM data signal is unmodulated, waveform G illustrates a series of pulses which have zero crossings at substantially equal periods of 10 μsec. for the first two cycles and lesser zero crossing periods of 9.9 μsec. during the last two cycles. The exemplary time differences in the periods of the data zero crossings are indicative of the flutter phenomenom and will continually vary along the length of the recording tape. The third zero crossing detector 34 receives the data signal and produces an output signal as shown in waveform H of FIG. 2 wherein the zero crossings of the input data signal are noted by the production of a series of pulses each approximately 0.1 μsec. wide. The variable delay multivibrator 36 receives the output from the detector 34 and produces an output signal which is delayed in time according to the value of the error control signal produced by the output of integrator 30. In this particular example, the multivibrator 36 is constructed to produce an output pulse with a positive-going edge at a time consistent with the receipt of the positive-going edge of the input pulse, and a negative-going edge that is variable in time about a median delay of 4.5 μsec. which corresponds to a zero TBE. That is, for a zero TBE the output level from the integrator 30 will be +2.5 volts and the variable delay multivibrator 36 will produce an output pulse starting in coincidence with the input to the multivibrator 36 and ending 4.5 μsec. later with a negative-going edge. Because the TBE can either lead or lag by 1.5 μsec., the multivibrator 36 will produce an output pulse of (4.5–1.5)=3.0 μsec. if the reference tone is lagging the reference oscillator output and a pulse width of (4.5+1.5)=6.0 μsec. if the reference tone is leading the output from the reference oscillator. The median time delay period produced by the multivibrator 36 is arbitrarily chosen but is restricted to a minimum value which is at least equal to or greater than the maximum leading time base error plus the inherent delay time through the integrator 30. In other words, the median delay time of the multivibrator 36 must prevent the case in which an output is required before an input signal is available. Accordingly, waveform J shows a series of pulses each having positive going edges coincident with the positive going edges of the data signal shown in waveform G and wherein the first five pulses beginning at $t_1$ have a width of 3.0 μsec. and the succeeding pulses beginning at $t_6$ have a width of 3.1 μsec., all indicative of a progressively decreasing lagging data signal. The trailing edge detector 38 receives the output from the multivibrator 36 and produces a somewhat irregular spiked type pulse at periodic intervals indicative of the trailing or negative-going edges of the signal shown in waveform J. The single shot 40 receives the output signal from the detector 38 and shapes the spiked type input signal into a regularly shaped pulse approximately 0.1 μsec. wide having a desired amplitude as shown in waveform L. The flip-flop 42 has its toggle input connected to receive the output signal from the single shot 40 and produces a series of regularly spaced pulses as shown in waveform M whose leading and trailing edges are triggered by the pulses shown in waveform L. The output signal shown in waveform M is generated at the output terminal 42 and represents a replica of the data signal that has been modified by the time base error correction as taught by the present invention. The flutter irregularities shown in waveform G are now removed as shown in waveform M wherein the unmmodulated FM data signal has a regular period. The delay of the output signal shown in waveform M as referenced to the input signal shown in waveform G is indicative of the median predetermined delay time provided by the multivibrator 36 but is of no serious consequence because the tape recording system is essentially a storage device and is not intended for real time use. Moreover, the sense of the output data at terminal 44 is of no serious cocnsequence inasmuch as it is the zero crossings of the data signal that give significance to the recorded data.

Thus it may be seen that there has been provided a novel device for reducing the flutter in FM magnetic tape recording systems by appropriately varying the zero crossings of data signals in playback according to the amount of time base error within the recording system.

Obviously many modifications and variations of the invention are possible in light of the above teachings. It is therefore to be understood that within the scope of the appended claimss the invention may be practiced otherwise than as specifically described.

What is claimed is:

1. A time base error correcting system for FM tape recorders having a reference tone on a first tape track and data signals on a second tape track comprising, in combination:

first pulse generating means for producing a series of periodic output pulses having a frequency equal to the average frequency valve of said reference tone;

second pulse generating means adapted to receive said reference tone for producing a series of output pulses indicative of the zero crossings of said tone;

delay means connected to receive said second generating means output pulses for producing a time delayed replica output thereof;

pulse width encoding means connected to receive said first pulse generating means output signals and said delay means output for producing an output pulse having a variable width dependent upon the time separation between corresponding ones of said first pulse generating means output signals and said delay means output pulses;

clocking means connected to receive said pulse width encoding means output pulse for producing a series of periodic clock pulses for the duration of said output pulse;

counting means connected to receive said first pulse generating means output pulses and said clock pulses for producing a digital count indicative of the width of said pulse width encoding means output pulse upon the receipt of individual ones of said first pulse generating means output signals;

analog transformation means connected to receive said digital count for producing a smoothed analog signal representation of said digital count;

third pulse generating means adapted to receive said data signals for producing a series of output pulses indicative of the zero crossings of said data signals;

variable delay means connected to receive said third pulse generating means output pulses and said analog signal for delaying respective ones of said third pulse generating means output pulses for a time proportional to the value of said analog signal and for providing an output representative thereof;

fourth pulse generating means connected to receive said variable delay means output for producing a series of regularly shaped output pulses indicative of the trailing edges of respective ones of said variable delay means output pulses; and fifth pulse generating means connected to receive said fourth generating means output pulses for producing a series of output pulses having widths corresponding to the sequential time occurrence of said fourth generating means output pulses;

whereby said fifth generating means output pulses are indicative of the data signals corrected for time base error.

2. A compensating system according to claim 1 wherein said first pulse generating means further comprises:

a reference oscillator for producing a sinusoidally varying periodic signal; and a zero crossing detector for producing the periodic output pulses.

3. A compensating system according to claim 2 wherein said second pulse generating means is a zero crossing detector.

4. A compensating system according to claim 3 wherein said delay means is an analog delay line.

5. A compensating system according to claim 3 wherein said delay means is a clocked shift register.

6. A compensating system according to claim 3 wherein said delay means is a clocked counter.

7. A compensating system according to claim 3 wherein said pulse width encoding means is a flip-flop having a set input connected to receive said first pulse generating means output signals, a clear input connected to receive said delay means output, and a non-inverting output for producing the output pulse.

8. A compensating system according to claim 7 wherein said clocking means further comprises:

an oscillator for producing the series of periodic clock pulses; and an AND gate having a first input connected to receive said pulse width encoding means output pulse, a second input connected to receive the oscillator clock pulses, and an output for producing the clocking means output.

9. A compensating system according to claim 8 wherein said counting means is a binary counter.

10. A compensating system according to claim 9 wherein said analog transformation means further comprises:

a digital-to-analog converter connected to receive said counting means digital count for producing an analog output signal representative thereof; and an analog integrator connected to receive the digital-to-analog converter output signal for integrating said converter output signal and for producing the smoothed analog signal.

11. A compensating system according to claim 10 wherein said variable delay means is a variable delay multivibrator.

12. A compensating system according to claim 11 wherein said fourth pulse generating means further comprises:

a trailing edge detector connected to receive said variable delay multivibrator output and for providing a series of irregularly shaped output pulses indicative of the trailing edges of respective ones of said variable delay multivibrator output pulses; and a single shot connected to receive said irregular pulses for generating the fourth pulse generating means output pulses.

13. A compensating system according to claim 12 wherein said fifth pulse generating means is a flip-flop having a toggle input connected to receive said fourth generating means output pulses and a non-inverting output for producing the corrected data signals.

* * * * *